United States Patent [19]
Rucker et al.

[11] Patent Number: 5,351,066
[45] Date of Patent: Sep. 27, 1994

[54] ROTATING PLANE KEYBOARD

[75] Inventors: Lance M. Rucker; Keith W. Hoyle, both of Vancouver; Allen B. Hepworth, Coquitlam, all of Canada

[73] Assignee: Ergologic Enterprises Inc., Vancouver, Canada

[21] Appl. No.: 727,810

[22] Filed: Jul. 8, 1991

[51] Int. Cl.$^5$ .................... B41J 5/08; H01H 13/70
[52] U.S. Cl. .................... 345/168; 400/489; 400/488
[58] Field of Search .................... 400/485, 488–490, 400/493, 495, 492, 496, 479, 715, 494, 82, 703, 713; 340/710; 345/168; 341/22, 32; 200/4, 5 R, 5 A, 6 R, 16 R

[56] References Cited

U.S. PATENT DOCUMENTS

| | | | |
|---|---|---|---|
| 1,277,169 | 8/1918 | Anderson | 400/715 |
| 3,990,565 | 11/1976 | Felton et al. | |
| 4,191,866 | 3/1980 | Nakajima et al. | 200/4 |
| 4,483,634 | 11/1984 | Frey et al. | 400/488 |
| 4,509,873 | 4/1985 | Ryan | 400/472 X |
| 4,597,681 | 7/1986 | Hodges | 400/489 |
| 4,661,005 | 4/1987 | Lahr . | |
| 4,755,072 | 7/1988 | Hoornweg | 400/490 |
| 4,769,516 | 9/1988 | Allen | 400/488 |
| 4,798,485 | 1/1989 | Onoda et al. | 400/703 |
| 5,004,196 | 4/1991 | Gross . | |
| 5,067,834 | 11/1991 | Szmanda . | |
| 5,073,050 | 12/1991 | Andrews . | |
| 5,122,786 | 6/1992 | Rader | 340/710 |
| 5,160,919 | 11/1992 | Mohler et al. | 345/168 |

FOREIGN PATENT DOCUMENTS

| | | | |
|---|---|---|---|
| 3318227 | 11/1984 | Fed. Rep. of Germany | 400/489 |
| 8400518 | 2/1984 | PCT Int'l Appl. . | |
| 8902369 | 3/1989 | PCT Int'l Appl. . | |
| 1016993 | 1/1966 | United Kingdom . | |

*Primary Examiner*—Alvin E. Oberley
*Assistant Examiner*—Kara Farnandez
*Attorney, Agent, or Firm*—Shlesinger Arkwright & Garvey

[57] ABSTRACT

An adjustable keyboard for electronic instruments having a pair of demi-boards which are extendable from a retracted, flat position to an extended, tetrahedal position wherein the distal side of one of the demi-boards is located closer to the other demi-board than the proximate side, the first and second demi-board planes intersect with the base plane to form an acute angle, the first and second demi-board planes intersect with each other at an apex intersecting line being in non-parallel alignment with the base plane and the first and second demi-board planes and the base plane intersect at an intersecting point in space on the distal side of the base member. A split spacebar may be actuated by movement about an axis parallel with the longitudinal axis of the demi-boards in either direction from a normal position and also on lateral movement along the said longitudinal axis. Adjustable hand rests are provided which may be raised or lowered with respect to the keyboard and which may be adjusted laterally to adjust the distance between each of a pair of hand contacting surfaces and a line laterally bisecting the keyboard.

29 Claims, 8 Drawing Sheets

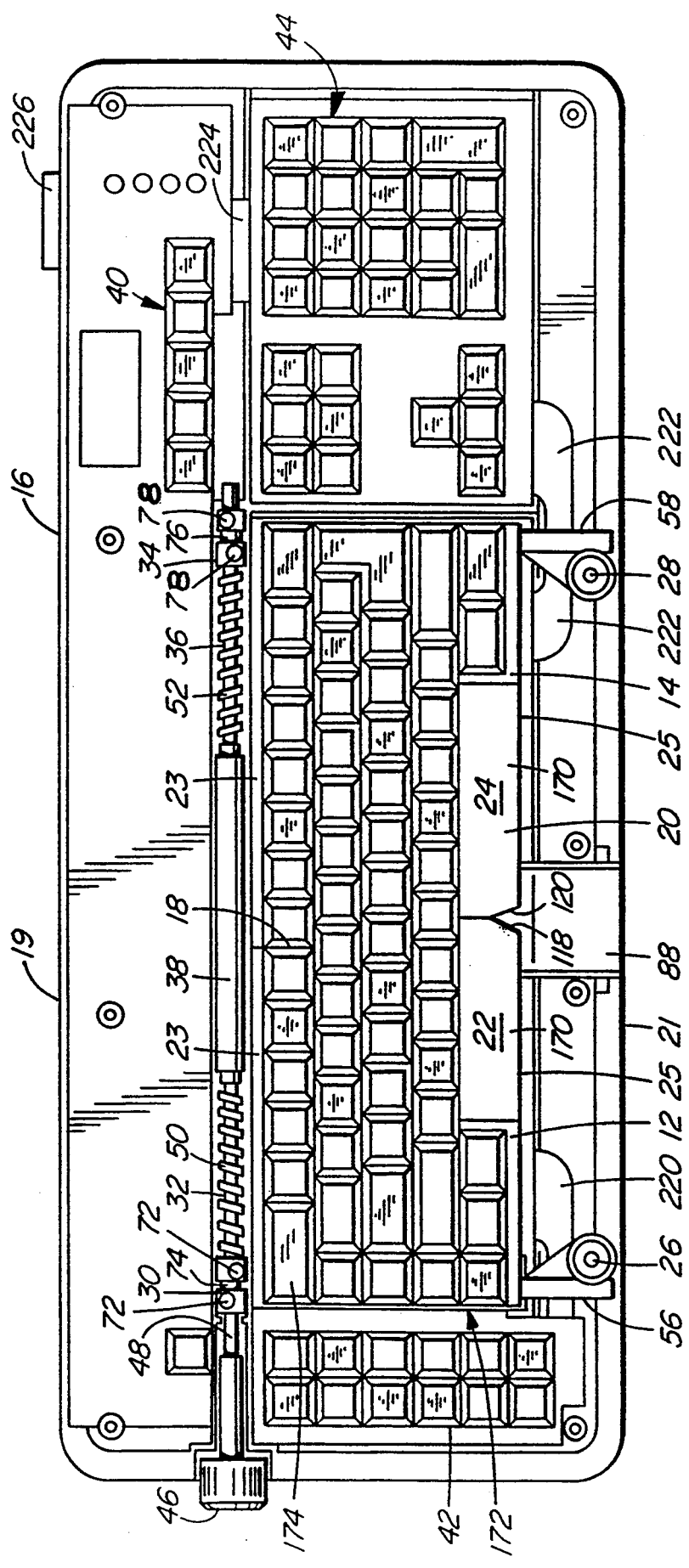
FIG. IB

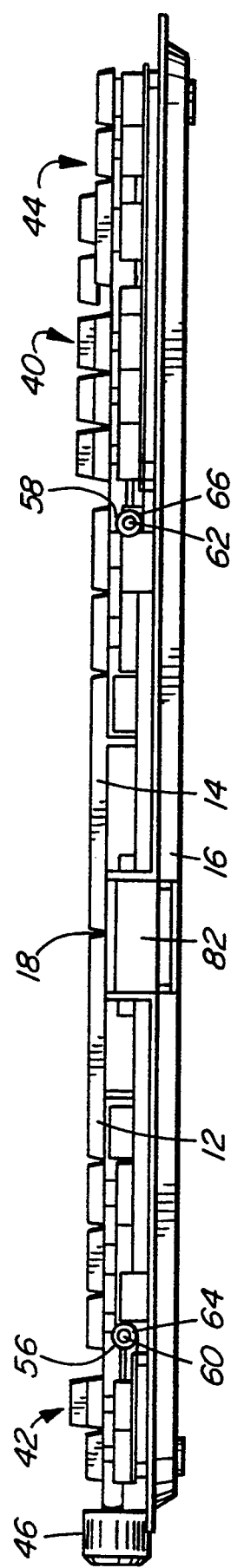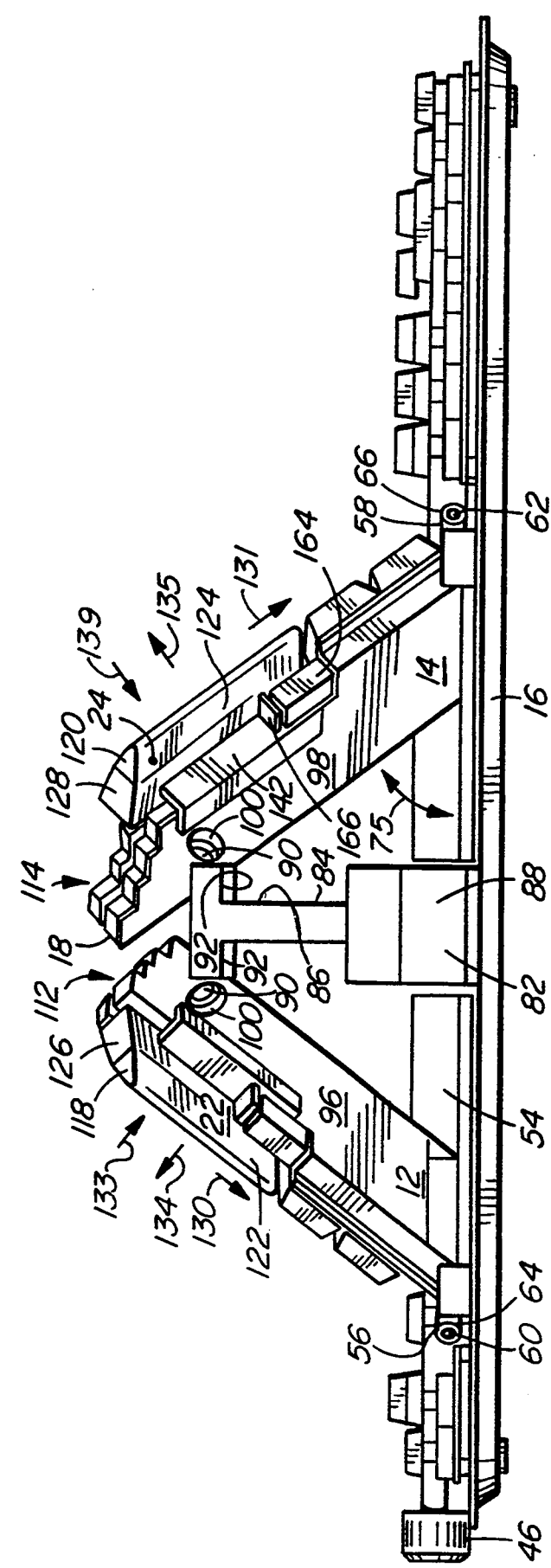
FIG. 2
FIG. 4

ROTATING PLANE KEYBOARD

BACKGROUND OF THE INVENTION

1. Field of the Invention

The present invention generally relates to keyboards for electronic instruments and, more particularly, is concerned with a keyboard having raised keys forming an implied tetrahedral shape with the base of the keyboard for facilitating use.

2. Description of the Prior Art

The frequent use of computers and other keyboards can cause serious physical injury and pain to the wrists and other areas of the arms of the users. This is generally caused through repetitive motion on the keyboards by the user's fingers on the keys. These disorders are generally known as cumulative-trauma disorders or repetitive-motion injuries resulting from the repetitive motion of the hands on the keyboards. As more and more individuals are using computer keyboards on a continuous and repetitive basis, these types of disorders are becoming more and more prevalent amongst computer users. Such repetitive use can also cause physical damage to the wrist, and more particularly to the carpal tunnel, known as Carpal Tunnel Syndrome, which can cause serious weakening of the hands and reduction in dexterity.

The standard monoplane keyboard, that being a keyboard defining one plane and lying generally flat on a table, exacerbates the problems associated with repetitive-motion injuries. The monoplane keyboard forces the user to rotate his or her forearms from a relaxed position to an extreme position so that the fingertips of each hand are horizontal. As well, both wrists must be flexed away from the thumb side of the hand in order to line up the fingertips with the longitudinal rows of keyboard keys. It has been determined that repositioning of the keyboard to permit more "natural" or unflexed positioning of the forearms and hands should significantly reduce the stress on the wrist and elbows, thereby reducing the instances of repetitive-motion injuries resulting from the use of computer keyboards.

An example of a keyboard in which the demi-boards are positioned in an A-frame orientation is disclosed in U.S. Pat. No. 4,509,873 issued to Ryan. The Ryan patent discloses a computer keyboard incorporating a base member having a distal face for orienting away from the user and an adjacent face for orientation adjacent a user and a pair of demi-boards which may be split in an A-frame orientation. Adjustment from a flat horizontal position to an angled position is achieved through the raising of the central portion of the demi-boards from the flat base member. The base member is angled so that the distal side is higher than the adjacent side. As well, the intersecting point of the two demi-boards is perpendicular to the plane of the top face of the base member.

As well, U.S. Pat. No. 4,597,681 to Hodges discloses the use of an adjustable keyboard having a base member and a pair of demi-boards which may be raised at their joining edge into an A-frame configuration. As well, each demi-board may be pivoted within its respective plane about an axis perpendicular to that plane. Hodges provides a generally flat base member with a generally dish-shaped surface of the keys. The keys may be positioned in a non-planar manner on each demi-board.

Each of these A-frame type adjustable keyboards, while representing an improvement over the monoplane keyboard in terms of hand positioning, do not generally provide sufficient optimization of wrist and forearm positions when the fingers are placed in contact with the key faces. These keyboards still force the user to bend the wrists upwardly and/or outwardly to align the fingertips with the keys on each demi-board. It is not possible, if one is to maintain proper finger alignment to the keys, to orient the wrists in linear alignment with the forearm, as the planes of the demi-boards in an A-frame orientation are still parallel to the proximal-distal axis of the keyboard base. In other words, a user is still forced into a position where his wrists are bent backwards to some degree forming an angle with the forearm, in order to properly contact such a keyboard.

Consequently, there is a need for a keyboard with adjustable demi-boards which may be raised, with respect to a base member, in a position wherein the distal edge of the demi-boards is oriented inwardly as compared to the adjacent edges of the demi-boards so that the demi-boards parallel the forearms of the user and so that the fingertips of the user may contact the keys on the demi-boards while the wrist and forearms are in substantial linear alignment.

SUMMARY OF INVENTION

In accordance with the present invention an adjustable keyboard for data input is provided having a base member for contact with a support surface, the base member defining a longitudinal base plane extending through the base member. The base member has a distal side intended for orientation away from a user and a proximate side intended for orientation adjacent a user, and first and second ends joining the distal and proximate sides. A first demi-board is provided having a distal side for orientation away from a user and a proximate side for orientation adjacent a user, the first demi-board defining a first demi-board plane extending longitudinally through the first demi-board. The first demi-board is pivotably connected to the base member for pivotal movement of the first demi-board in an arc between a retracted position in which the first demi-board plane is substantially coplanar and parallel with the base plane and an extended position in which the first demi-board extends at an acute angle with respect to the base member. A plurality of user activated keys extend from a face of the first demi-board, the keys facing away from the base member. The second demi-board having a distal side for orientation away from a user and a proximate side for orientation adjacent a user is provided, the second demi-board defining a second demi-board plane extending longitudinally through the second demi-board. The second demi-board is pivotably connected to the base member for pivotable movement of said second demi-board in an arc between a retracted position in which the second demi-board plane is substantially coplanar and parallel with the base plane and an extended position in which the second demi-board extends at an acute angle with respect to the base member. A plurality of user activated keys extend from a face of the second demi-board, the keys facing away from the base member. When in the extended position the base plane, first demi-board plane and second demi-board plane form a tetrahedral shape wherein:

(1) the distal side of one of the demi-boards is located closer to the other demi-board then the proximate side;

(2) the first and second planes each intersect with the base plane to form an acute angle;

(3) the first and second planes intersect with each other at an apex intersecting line in space, the apex intersecting line being in non-parallel alignment with the base plane; and (4) the first, second and base planes intersect with each other at an apex intersecting point in space beyond the distal side of the base member.

In a further embodiment of the present invention a spacebar is provided for a data entry keyboard, the keyboard having a pair of demi-boards containing data entry keys extending from a base member and being pivotable about an axis adjacent the outer side of the demi-boards to a raised position wherein the demi-boards extend at an acute angle from the base member. The space bar includes a pair of manually actuable platforms for user contact hingedly connected to the demi-board about a pivot axis parallel with the longitudinal axis of respective demi-boards, the platforms having a normal position when no user contact occurs and the platforms connected for alternate pivotable movement about the axis and for slideable movement along the longitudinal axis in a direction toward the outer side of the demi-boards, from the normal position. The space bar further includes signal actuating means connected to the demi-boards for actuating a signal upon movement of either of the platforms about the pivot axis in either direction from the normal position to a pre-determined position or upon the slideable movement to a pre-determined position, the signal indicative of the activation of the space bar.

In a further embodiment of the present invention a hand rest for a data entry keyboard is provided including hand contacting means for contacting a hand of a user and mounting means for mounting the hand contacting means to the keyboard. The mounting means includes height adjusting means for adjusting the vertical distance between the hand contacting means and the keyboard and width adjusting means for adjusting the horizontal distance between the hand contacting means and a line laterally bisecting the keyboard.

BRIEF DESCRIPTION OF THE DRAWINGS

FIG. 1B is a top view of the keyboard of FIG. 1A with parts broken away to show details of the demi-board raising mechanism;

FIG. 2 is a front view of the keyboard of FIG. 1A, with parts broken away and with the demi-boards in the lowered or flat position;

FIG. 4 is a front view of the keyboard of FIG. 1A, with parts broken away and with the demi-boards in a raised or tetrahedral position;

DETAILED DESCRIPTION OF THE INVENTION

Figure 1A:
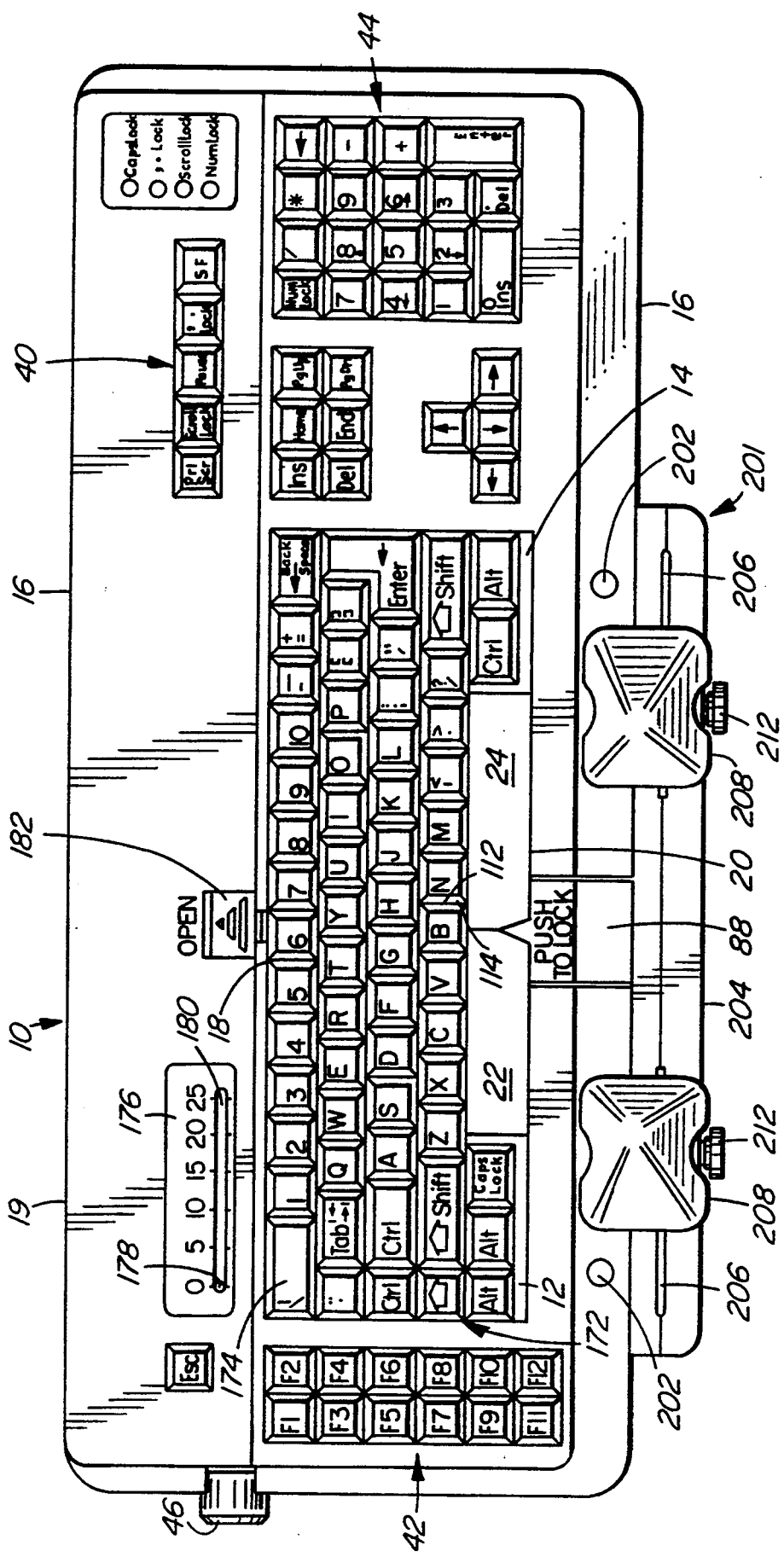
FIG. 1A is a top view of a keyboard in accordance with this invention, showing the hand rests and full key layout, the demi-boards being in their lowered or flat position.

FIG. 1A is a top view of an embodiment of the invention wherein keyboard 10 is in a lowered or flat position with left demi-board 12 and right demi-board 14 co-planar with base member 16. It will be appreciated on viewing FIG. 1A that keyboard 10, when demi-boards 12 and 14 are in the retracted, flat position is virtually identical to a standard computer data entry keyboard with a QWERTY key placement. Optimally, the shaping, positioning and tactile pressure required for depression of each key is similar to that found in standard keyboards so that adjustment to keyboard 10 by users is minimized and so that the user's tactile abilities in orienting himself or herself with respect to the keyboard are unchanged. This enables a user to use keyboard 10 while in the retracted or flat position in much the same manner as a "standard" keyboard.

Demi-boards 12 and 14 contain a plurality of user-activated keys thereon which, as shown in FIG. 1A, are in the QWERTY arrangement. However, it should be appreciated that other key arrangements can be employed with keyboard 10, such as the Dvorak or other key layouts. Each key is reserved, in accordance with established typing convention, for actuation by the user in order to signal an electronic device to display or type the symbol, letter or number corresponding to the key depressed.

Demi-boards 12 and 14 are split in an offset manner along heavy line 18 which passes between adjacent keys on the keyboard and which is offset along each key row in order to avoid splitting a key position. Line 18 also bisects space bar 20 into left half 22 and right half 24.

Figure 3A:
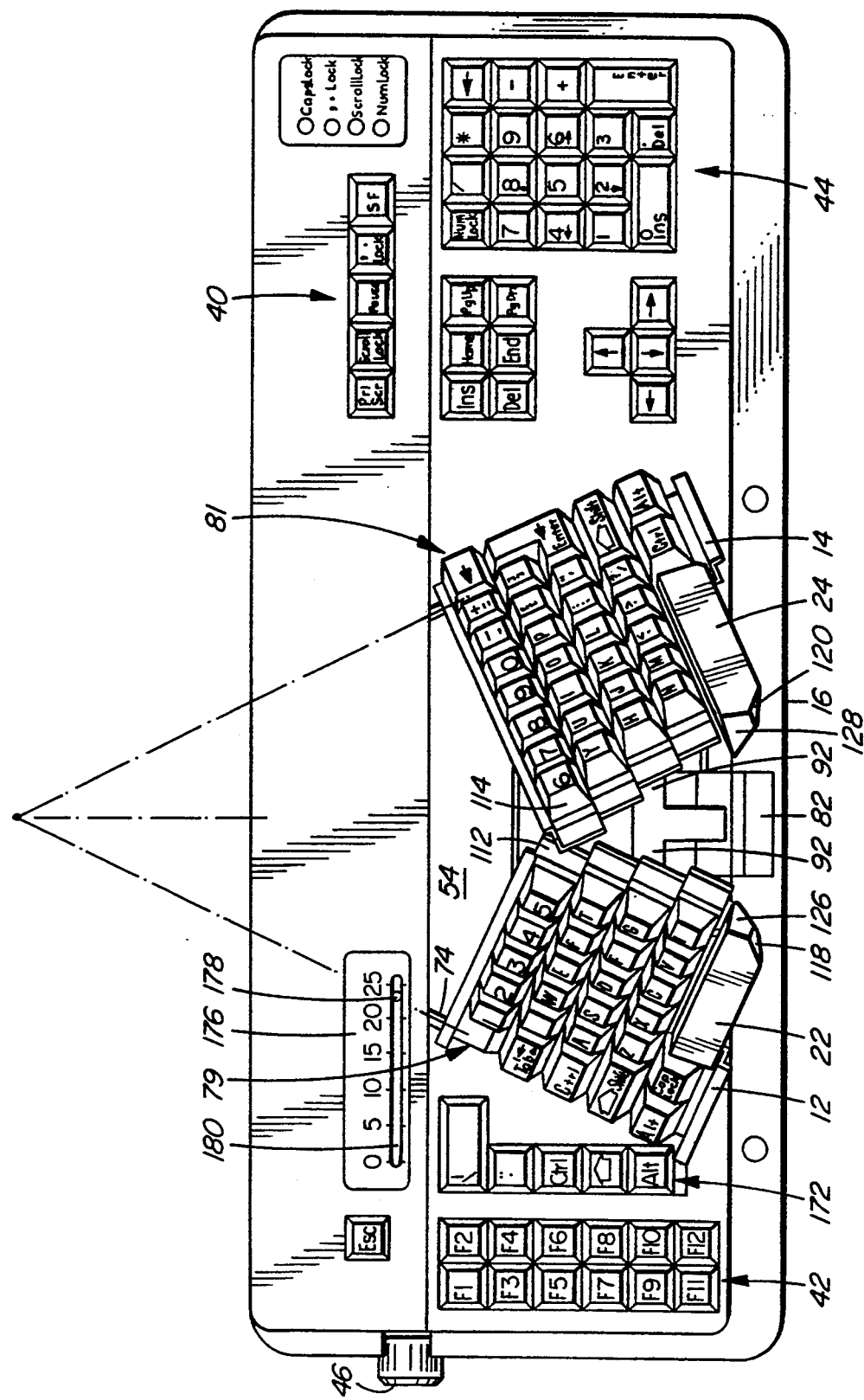
FIG. 3A is a top view of the keyboard of FIG. 1A, with the demi-boards in a raised or tetrahedral position.
Figure 3B:
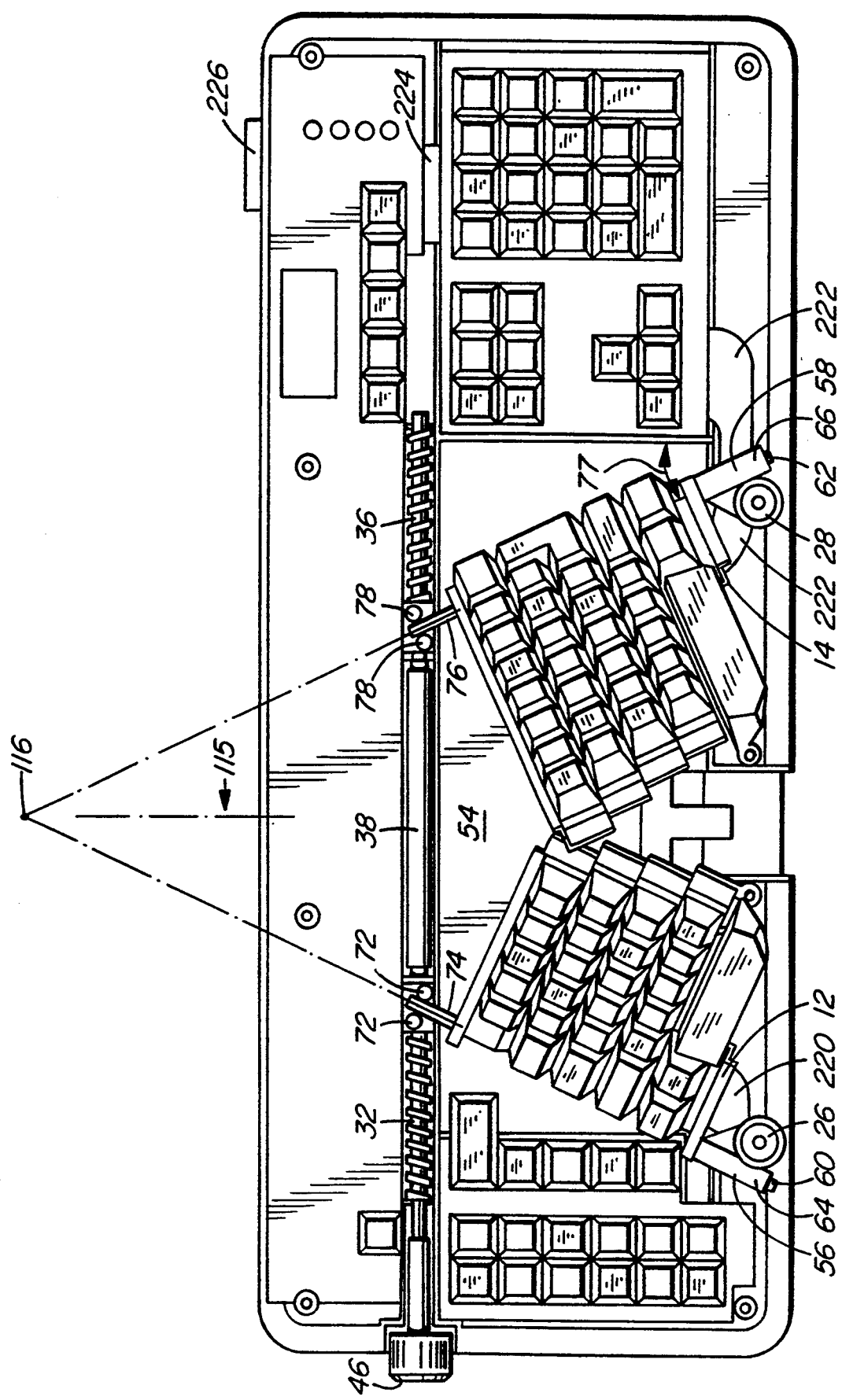
FIG. 3B is a top view of the keyboard of FIG. 3A with parts broken away.

As seen in FIG. 1B, demi-board 12 is rotatably attached to base member (16) by means of rotation axis screw 26 which acts as a pivot axis for demi-board 12 in its rotation from a retracted flat position (as shown in FIG. 1B) to an extended tetrahedral position (as shown in FIG. 3B). Similarly, rotation axis screw 28 rotatably attaches right demi-board 14 to base member 16 and acts as an axis of rotation for demi-board 14 for movement between a flat, retracted position (as shown in FIG. 1B) to an extended tetrahedral position (as shown in FIG. 3B). Base member 16 includes distal side 19, intended for orientation away from a user and proximate side 21 intended for orientation adjacent a user. Each of demi-boards 12 and 14 include a distal side 23 intended for orientation away from a user and a proximate side 25 intended for orientation adjacent a user.

Demi-board 12 is also connected to base member 16 by means of housing 30 connected adjacent the top outer side of demi-board 12. Housing 30 is connected to screw 32 for movement laterally along screw 32 on rotation of screw 32 to raise and lower demi-board 12 from the flat retracted position to the extended tetrahedral positions. Similarly, housing 34 is attached adjacent the upper outer corner of demi-board 14. Housing 34 is connected to screw 36 for slideable movement along screw 36 on rotation of screw 36. Screw 32 and screw 36 are connected by means of connection member 38 so that rotation of screw 32 is in sychronization with the rotation of screw 36. Alternatively, screw 32, member 38 and screw 36 may be of unitary construction.

It is common in modern keyboards to provide additional keys which may act to initiate various functions inherent in particular software products as well as initiating hardware and firmware variations of keyboard functions. These can include function keys 40 and can be oriented in a line adjacent the longitudinal axis of base member 16 above demi-boards 12 and 14. These can also include function keys 42 located to the left of left demi-board 12. Keys 44, which are located on base member 16 to the right of right demi-board 14, are generally provided to assist in cursor movement and also to provide an alternate numerical keypad in addition to the numerical key rows located on demi-boards 12 and 14. It has been found that where users will generally use tactile and other memory indications of key positioning on the main components of the QWERTY keyboard as located on demi-boards 12 and 14, other function keys, including function keys 40, 42 and 44 are generally located by the user using visual aides. The main component QWERTY keys located on demi-boards 12 and 14 are the keys which are used the majority of time by a typist. Keys 40, 42 and 44 which are usually located visually, remain a part of base member 16 and are not raised or lowered with the raising or lowering of demi-boards 12 and 14. Keys 40, 42 and 44 are depressed in the normal manner by pressing downwardly on these keys oriented in a flat horizontal plane defined by base member 16. This flat positioning facilitates the visual locating of these keys.

Screws 32 and 36 are manually actuable by the user to move demi-boards 12 and 14 between the lowered and raised positions. Rotatable knob 46 extends laterally from the left side of base 16. Knob 46 is attached to end shaft 48 of screw 32 to cause screws 32 and 36 to rotate upon rotation of knob 46. Note that the screw blades 50 of screw 32 are in reverse orientation as compared to screw blades 52 of screw 36. As a consequence, on rotation of knob 46 in a clockwise direction will cause housing 30 to travel towards line 18. This rotation will also cause housing 34 to move in an opposite direction, also towards line 18. This will cause the outer distal corners of demi-boards 12 and 14 to move in arcs about axis points 26 and 28 respectively as knob 46 is turned. Concurrently, as will be described below, the inner distal corners of demi-boards 12 and 14 are raised from the horizontal flat position to permit inward movement of each demi-board without contacting the other demi-board.

In order to maintain substantially the same height position of the keys on demi-boards 12 and 14 as compared to keys 40, 42 and 44, whenever keyboard 10 is in its flat, retracted position, demi-boards 12 and 14 are seated within cavity 54 in base member 16. Cavity 54 is just slightly larger in outer dimension as compared to demi-boards 12 and 14 when in their co-planar recessed position, as shown in FIG. 1A.

In order to properly orient demi-boards 12 and 14 with respect to pivot axes represented by axis screws 26 and 28, demi-boards 12 and 14 are spaced from screws 26 and 28 by lateral extension member 56 with respect to left demi-board 12 and lateral extension member 58 for right demi-board 14. As seen in FIG. 2, lateral extension members 56 and 58 incorporate inner shaft member 60 and 62, respectively. Outer shaft member 64 is rotatable about inner shaft member 60, which axis is perpendicular to the longitudinal axis of base member 16 when the keyboard is in the lowered or flat position. This permits the inner end of demi-board 12, adjacent line 18, to rise when moving from the flat position to an extended tetrahedral position. This also permits concurrent rotation of demi-board 12 about axis screw 26. Similarly, right lateral extension member 58 includes inner shaft member 62 and concentric outer shaft member 66. Outer shaft member 66 is rotatable about the longitudinal axis of inner shaft member 62. This enables the inner end of right demi-board 14, adjacent line 18, to be raised from the horizontal, flat position to an extended tetrahedral position, as shown in FIG. 3B.

Referring to FIG. 1B, housing 30 is connected to screw 32 by means of a lateral circular opening. (not shown) through housing 30 having grooves which mate with screw 32 which travels through the said opening. The grooves (not shown) in the said opening mate with and engage screw blades 50 of screw 32. Similarly, housing 34 also incorporates a lateral circular opening therethrough having inner grooves formed therein to mate with blades 52 of screw 36. Housing 34 may then travel laterally along screw 36 as inner grooves (not shown) of housing 34 engage screw blades 52 of screw 36. This enables housings 30 and 34 to ride laterally along respective screws 32 and 36 when rotatable knob 46 is rotated.

Left spindle 74, attached to demi-board 12, is rotatably connected to housing 30 by means of a pair of pins 72 extending laterally and upwardly from housing 30 to rotatably sandwich spindle 74 therebetween. Pins 72 are offset from a linear position parallel with the axis of screw 32, with left pin 72 oriented further away from demi-board 12 as compared to right pin 72. This permits rotational movement of spindle 74 as demi-board 12 is rotated about rotation axis screw 26 when moved from the flat retracted position to an extended tetrahedral position by movement of knob 46. Spindle 74 is cylindrical in shape to facilitate rolling action between left and right pins 72 as demi-board 12 is raised to an extended, tetrahedral position.

Similarly, right demi-board 14 includes right spindle 76. Pins 78 sandwich spindle 76 therebetween and act in a similar manner as pins 72 act on spindle 74. Rotation of knob 46 causes corresponding rotation of screw 36. Blades 52 engage corresponding grooves in opening (not shown) of housing 34 to move housing 34 towards connecting member 38, which thereby causes pins 78 to contact spindle 76 to move spindle 76, and thereby the upper outer edge of demi-board 14, toward connecting member 38 in an arc about rotation axis screw 28.

Each of the left and right demi-boards 12 and 14 may be raised or lowered through an infinite number of positions along an arc between the lowered, flat position and the most raised, tetrahedral position shown in FIG. 3A. The preferred range of positions of demi-boards 12 and 14 includes a horizontal rotation angle 77

(that being the angle between the outer end of the base member and the end of either demi-board) of from 0° to 30°, and an elevation angle 75 (that being the angle between the plane of the base member and the plane of either demi-board 12 or 14) of from 0° to 60°. Intermediate preferred angles of demi-boards 12 and 14 with respect to base member 16 and corresponding preferred distances between the F and J key contact points are as follows:

| Elevation Angle | Horizontal Rotation Angle | F and J Key Distance |
| --- | --- | --- |
| 0° | 0° | 57.0 mm |
| 10° | 1° | 67.0 mm |
| 20° | 2° | 79.5 mm |
| 30° | 7° | 89.0 mm |
| 40° | 16° | 93.5 mm |
| 50° | 26° | 95.0 mm |

Preferred angles may vary for each individual user, depending on that user's anatomical dimensions, preferred hand orientation and typing style. One benefit of the present invention is the adjustability of demi-boards 12 and 14 between the flat retracted position and the most extended tetrahedral position and the ability of the demi-boards 12 and 14 to assume any positions between these two extremes. This enables users to set particular demi-board positions in accordance with their own particular preferences.

Figure 5:
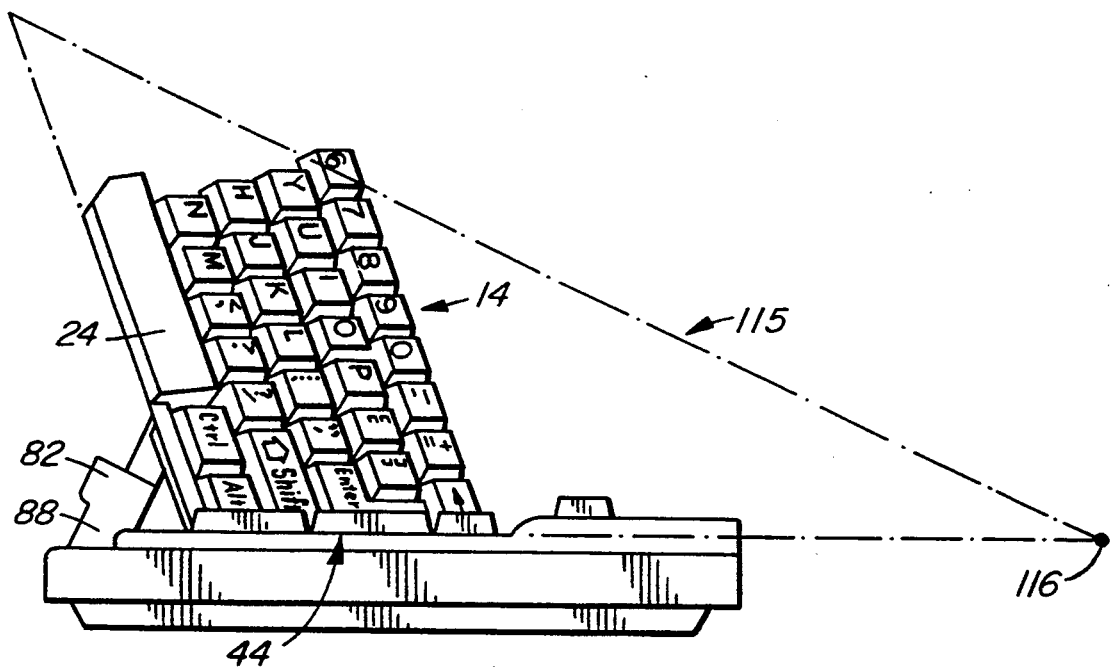
FIG. 5 is a side view of the keyboard of FIG. 1A, with the demi-boards in a raised or tetrahedral position.
Figure 6A:
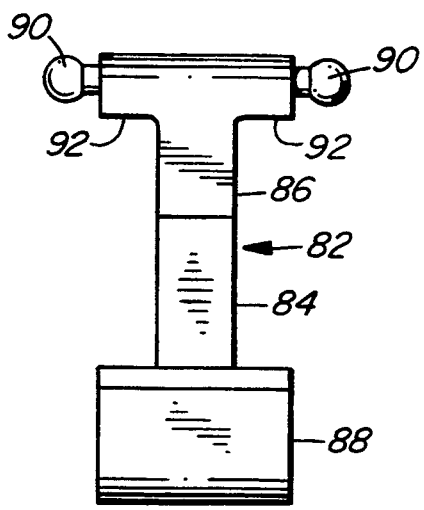
FIG. 6A is a front view of the t-bar support member in accordance with this invention.
Figure 6B:
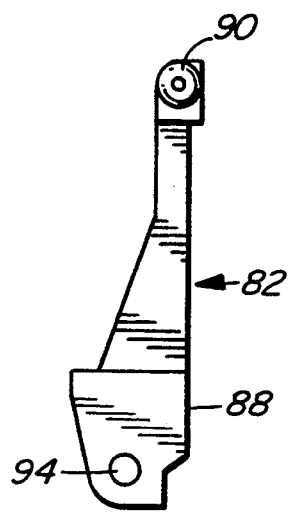
FIG. 6B is a side view of the t-bar support member of FIG. 6A.
Figure 6C:
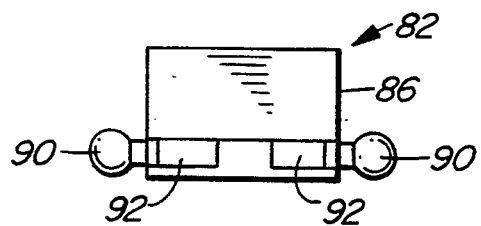
FIG. 6C is a top view of the t-bar support member of FIG. 6A.

FIGS. 4 and 5 and 6A through 6C show T-bar support member 82. As seen in FIGS. 6A through 6C, T-bar support member 82 includes shaft 84 connecting upper T-bar member 86 and lower base member 88. Upper T-bar member 86 includes a pair of opposed ball joint members 90 extending laterally from upper flanges 92 of T-bar member 86. Lower member 88 incorporates opening 94 extending laterally therethrough with central axis generally parallel with the common axis of ball joint members 90.

As depicted in FIG. 4, base member 88 is rotatably connected to base member 16 for pivotal movement between a lower position lying flat against base member 16 with demi-boards 12 and 14 covering T-bar shaft 84 and member 86 (shown in FIG. 1B), and an extended position (shown in FIG. 4) with T-bar support 82 angled upwardly from base member 16. FIG. 5 is a side view depicting the upward angling of T-bar support 82 when demi-boards 12 and 14 are in the most extended tetrahedral position.

Figure 7:
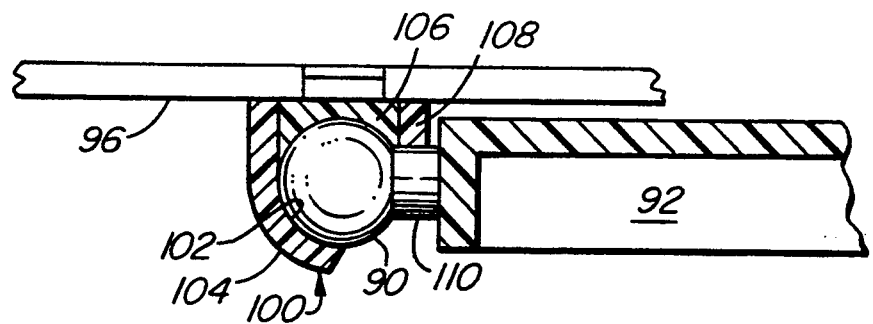
FIG. 7 is a close-up view of the ball and socket joint for joining the t-bar support member to the bottom of a demi-board in accordance with this invention.

Upper T-bar member 86 is rotatably connected to lower surfaces 96 and 98 of respective demi-boards 12 and 14 by means of a ball and socket joint shown in FIGS. 4 and 7. Socket 100 is positioned on each face 96 and 98. Socket 100 on face 96 is positioned generally below the F key of keyboard 10. Socket 100 attached to face 98 is located generally below the J key of demi-board 14 so that a line in space between the contact points of a user's left and right forefingers with keys F and J respectively, will always be parallel to the plane of base member 16 irrespective of the position of demi-boards 12 and 14. Socket 100 has a spherical inner surface to mate with the outer spherical surface of ball 90.

As depicted in close-up in FIG. 7, ball 90 is rotatable within and about inner surface 102 of socket 100. Socket 100 is comprised of three mated sections, generally L-shaped extension 104; base section 106 having a concave spherical portion and flange member 108 used to rotatably restrain ball 90 within socket 100. Flange member 108 extends to contact shaft 110 of ball 90 to retain ball 90 within socket 100. Alternately socket 100 may be of unitary construction of resilient material to enable ball 90 to "snap" into socket 100.

On rotation of T-bar support 82 to the extended position shown in FIG. 4 and 5, ball 90 will rotate within socket 100 and will lift socket 100 with the lifting of T-bar support 82 to the extended position. This will lift the inner edges 112 and 114 of demi-boards 12 and 14 those being the edges adjacent line 18 as shown in FIG. 1A. Demi-boards 12 and 14 are thereby moved to the extended tetrahedral position supported throughout by T-bar support 82. Because the outer distal corners 79 and 81 of demi-boards 12 and 14 are constrained by respective spindles 74 and 76 to move laterally along screws 32 and 36, positioning of sockets 100 below the F and J keys will cause a tilting of demi-boards 12 and 14 in planes generally extending downwardly toward base member 16 while the outer distal corners 79 and 81 of respective demi-boards 12 and 14 move inwardly towards the other demi-board as shown in FIG. 3A. The apex intersecting line 115 (see FIGS. 3B and 5) of the said planes is in nonparallel orientation with respect to the plane of base member 16 whenever demi-boards 12 and 14 are not in the retracted or lowered position. Intersecting line 115 will intersect with the plane of base member 16 at a point in space 116 on the distal side of keyboard 10 with respect to the user. Point 116 will move closer to base member 16 as demi-boards 12 and 14 are raised.

When demi-boards 12 and 14 are positioned correctly, the face of the keys are in generally optimal orientation for use by encouraging opposed positioning of the user's fingertips in such a manner so as to orient the wrists and elbows of the user in a generally neutral position in virtual linear alignment, without bending the wrists with respect to the forearm, with minimal ulnar deviation and minimal flexion of these joints.

The range of adjustability between the retracted, or flat position and the most extended, tetrahedral position, allows the keyboard to enhance postural performance for a wide range of anatomical variation of users and for a wide range of variation of settings in which the keyboards might be used.

Referring to FIGS. 1B and 3B, the keys on demi-boards 12 and 14 initiate electrical signal indicative of the depression of a particular key through conventional switch means connected to each key. This signal is directed to the electronic device by means of multiple cable 220 connecting cables from the keys of demi-board 12 to base member 16 and cable 222 connecting cables from the keys on right demi-board 14 with base member 16. Cables 220 and 222 are, in turn, connected with cable 224 which, in turn, is connected to cable output jack 226 which may be connected to a cable (not shown) connected to the electronic device. Cables 220 and 222 have sufficient slack to permit unimpeded rotation of demi-boards 12 and 14 from the flat, retracted position to the most extended, tetrahedral position. Note that cables 220 and 222 are close to respective pivot rotation axis screws 26 and 28 to cause minimal required movement of cables 220 and 222 when demi-boards 12 and 14 are moved from the retracted to an extended position.

The keys on demi-boards 12 and 14 are generally utilized by experienced typists through tactile location of a relevant key. Other keys on keyboard 10, including keys 40, 42 and 44 are generally visually located by users and would be partially obscured when the demi-boards 12 and 14 are raised, if these keys were to be placed on demi-boards 12 and 14. In order to facilitate visual identification, keys 40, 42 and 44 are located on base member 16 and are not raised on the raising of demi-boards 12 and 14.

The control key, alt key and shift keys are an exception in that, due to the relatively frequently use of these keys by computer users, many users will strike these keys through tactile feedback, while other users will use visual identification. In order to satisfy both users' requirements, a row of keys 172 has been provided. Row 172 includes a second adjacent row of control key, shift key and alt key. Row 172 is not raised or moved with the raising or movement of demi-boards 12 and 14. The adjacent control, shift and alt keys are located on demi-board 12 and do move with demi-board 12. FIG. 1A shows the adjusted position of adjacent keys when demi-board 12 is in the flat position and FIG. 3A shows the positioning of these keys when demi-board 12 is in the raised position.

An extended width backslash key 174 is also provided adjacent the upper left hand corner of keyboard 10. Backslash key 174 is located on base member 16 and remains horizontal irrespective of demi-board 12 position. As the backslash key is a commonly used key in DOS computer operation this enlarged backslash key facilitates locating and striking the backslash key.

As an optional element each of the control, alt and shift keys may be colour coded to further distinguish and identify these keys. For example, Word Perfect software system provides for green colour coding of the shift key, red colour-coding for the control key and blue colour-coding for the alt key. This colour coding assists the user in identifying the proper key sequences to be struck to cause the software program to perform a particular function. Keyboard 10 can include a green shift key, a red control key and a blue alt key in accordance with this software.

As seen in FIGS. 1A and 3A, keyboard 10 also includes indicator 176 which provides a gauge of horizontal rotation angles for demi-boards 12 and 14. Coloured marker 178 moves longitudinally along opening 180 in indicator 176. As seen in FIG. 3A marker 178 is connected to housing 30 and moves with movement of housing 30. Numerical references on indicator 176 are scaled such that lateral movement of housing 30 will cause marker 178 to align with the corresponding angle indicator number on indicator 176. In this way the user may rotate knob 46 to a pre-determined angled position as indicated on indicator 176 and thereby re-position demi-boards 12 and 14 in a desired and reproduceable position with respect to base member 16.

Figure 8:
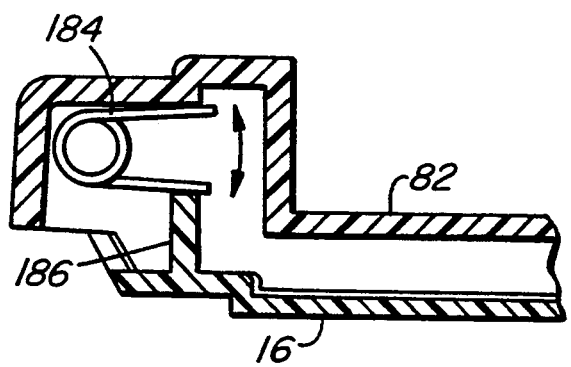
FIG. 8 is a cross-sectional view of a portion of the t-bar support member of FIG. 6A hingedly connected to the base member showing the biasing spring.
Figure 11:
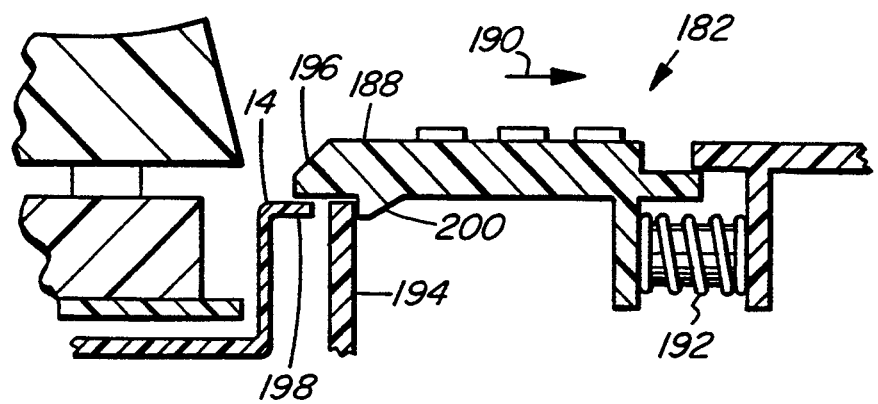
FIG. 11 is a cross-sectional view of the latch mechanism for the demi-boards, in accordance with this invention.

Referring to FIGS. 1A, 8 and 11, latch 182 retains demi-boards 12 and 14 in the lowered, flat position. FIG. 8 shows t-bar support member 82 lying flat against base member 16. Biasing spring 184 is connected between t-bar support 82 and flange 186 of member 16 to bias t-bar support 82 away from member 16. Spring 184 biases t-bar support 82 to an angular, non-horizontal position to facilitate upward adjustment of demi-boards 12 and 14 from the lowered, flat position.

Referring to FIG. 11, latch 182 incorporates manual actuable member 188 slidable horizontally in the direction of arrow 190 to unlatch demi-board 14. This horizontal movement permits spring 184 to bias t-bar support 82 away from base member 16 thereby initiating the rise of demi-boards 12 and 14 from the flat or retracted position. Member 188 includes spring 192 which biases latch 188 in the latched position against holding flange 194. Extended portion 196 of member 188 extends over lateral flange 198 of demi-board 12 to retain demi-board 12 in the flat position against the bias of spring 184. Movement of member 188 in the direction of arrow 190 against spring 192 will permit flange 198 to rise past extended portion 196. Lip 200 on member 188 contacts holding flange 194 to prevent excessive biasing of member 188 by spring 192.

When demi-boards 12 and 14 have been adjusted downward to the retracted position using knob 46, demi-boards 12 and 14 may be secured and locked in the fully retracted position. Downward pressure by the user on demi-boards 12 and 14 or on t-bar support 82, will cause t-bar support 82, and demi-boards 12 and 14, to be locked into the flat or retracted position.

Space Bar

The space bar of the present invention will now be discussed with particular reference to FIGS. 1B, 4 and 9. FIG. 1B shows space bar 20 split in two halves; left half 22 and right half 24. When demi-boards 12 and 14 are in the retracted, flat position, space bar 20, incorporating halves 22 and 24, is activated by the user in the same manner as a space bar activated on any monoplane keyboard. The user simply depresses either half of halves 22 and 24 downwardly in the direction of base member 16, in order to signal the electronic device that a space should be inserted. Space bar 20 is positioned on demi-boards 12 and 14 in relatively the same position with respect to the other keys as in a conventional keyboard to minimize adaptation by users who are familiar with standard computer keyboards.

Referring to FIG. 4, demi-boards 12 and 14 are shown in the raised tetrahedral position supported by T-bar support 82. On raising of demi-boards 12 and 14, which splits demi-boards 12 and 14, separation of halves 22 and 24 occurs. This permits the user to activate a space signal upon depression of either half 22 or half 24 with either the left or right hand. A downward depression, in the direction substantially of T-bar support 82 will cause a signal representing a space to be sent to the relevant connected electronic device (not shown).

AS seen in FIG. 4, once demi-boards 12 and 14 are raised from a horizontal position, lower faces 122 and 124 of respective halves 22 and 24 is exposed to view and may be contacted by the thumb of the user. Advantageously, space bar halves 22 and 24 may also be activated by upward pressure from below against faces 122 or 124 to cause a space signal to be sent. In addition, on raising of demi-boards 12 and 14 from the horizontal position, medial faces 126 and 128 and notches 118 and 120 of halves 22 and 24 respectively, are also exposed for contact with the thumb of a user. The user may place either or both thumbs on faces 126 and 128 respectively and push downwardly in the direction of arrow 130 or 131 with sufficient pressure to cause a space signal to be sent. Similarly, sufficient thumb pressure on surfaces 122 or 124 in the direction of arrows 134 or 135 will cause a space signal to be sent. As discussed above, activation of space bar halves 22 or 24 can also occur through conventional downward pressure on space bar halves 22 or 24 in the direction of arrows 138 or 139.

The activation of a signal representing a space, through manipulation of space bar halves 22 and 24, will be discussed with particular reference to FIG. 9, which is a close-up representation of a portion of space bar half 24. Space bar half 24 is connected to lower surface 98 (FIG. 5) of demi-board 14 by means of an L-shaped hinge 142. Hinge 142 includes extension 144 having an outer cylindrical contact surface 146 which contacts surface 98 as space bar half 24 is moved in either the directions of arrows 135 or 139 as hinge 142 pivots about hinge axis 148. Extension 144 extends distally along surface 98 to extend the pivot radius of hinge 142. This lengthened radius provides a straighter upward or downward movement of half 24 in directions of arrows 135 or 139 respectively as compared to a hinge of lesser radius. This provides a substantially linear movement of hinge 142 in either of directions 135 and 139, thereby more accurately simulating the straight downward movement of a space bar of a standard keyboard.

Figure 9:
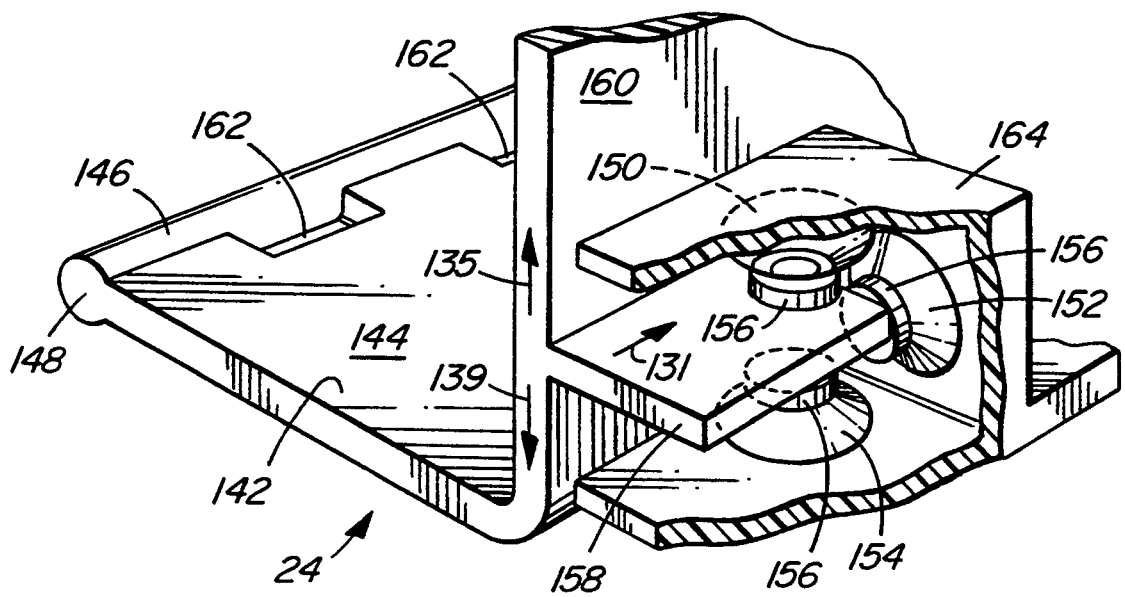
FIG. 9 is a close-up view with some parts broken away and some parts in ghosted outline, of the three-way switch mechanism for the space bar in accordance with this invention.

Activation of electronic signals to the electronic device attached to the keyboard is initiated by contact of space bar half 24 with one of upper switch 150, lateral switch 152 and lower switch 154 (FIG. 9). Switches 150, 152 and 154 are connected through standard electric cabling in conjunction with respective cables 220 and 222 and through cables 224 and jack 226 to the input of the electronic device, in the same manner as previously discussed concerning key activation above.

Each switch 150, 152 and 154 includes button 156 which is depressed in order to send an electrical signal to the electronic device. Hinge 142 includes lateral flange 158 extending laterally from perpendicular hinge arm 160. Flange 158 is positioned equidistant between switches 150 and 154 with a similar distance between switch 152 and adjacent face of flange 158. Upon movement of space bar 24 in the direction of arrow 135, contact with button 156 of switch 150 will occur and button 156 will be depressed to send a signal corresponding to a space to the electronic device. Movement of space bar half 24 in the direction of arrow 139 will cause flange 158 to contact button 156 of switch 154, thereby causing an electrical signal corresponding to a space to be sent to the electronic device. Alternately, movement of space bar 24 laterally in the direction of arrow 131 will cause flange 158 to contact button 156 of switch 152, thereby also causing an electrical signal indicative of a space, to be sent to the electronic device. In order to facilitate lateral movement of space bar half 24 in the direction of arrow 131, hinge openings 162 are larger than the corresponding loop fastener (not shown) which attaches hinge 142 to surface 98 (FIG. 4). The additional spaces in openings 162 permit lateral movement of hinge 142 in the direction of arrow 131 on lateral pressure being applied on space bar half 24.

AS an additional feature, in order to prevent dirt and other foreign materials from being deposited adjacent switches 150, 152 and 154 or on flange 158, housing 164 supports switches 150, 152, and 154 and keeps foreign material away from the contact surfaces thereof. As seen in FIG. 4, hinge 142 also includes cover flange 166 movable with hinge 142 to provide additional covering of flange 158 and switches 150, 152 and 154. A predetermined space exists between housing 164 and flange 166 to permit lateral movement of space bar half 24 in the direction of arrow 131 in order to activate switch 152. Housing 164 is attached to demi-board 14 with sufficient space between housing 164 and arm 160 to permit pivotal motion of hinge 142 about pivot axis 148 as hinge 142 is moved in either of the directions 135 and 139.

It is common to reassign keys on the keyboard with other designations determined by the user. Users may prefer to have certain keys which they commonly use in a more accessible position on a keyboard. Space bar 20, by splitting into two components is particularly suited for redesignation by the user. As is commonly known, the thumb of the user is considered to be the most dexterous of the digits. On this keyboard the thumb is used to activate each space bar half 22 and 24 in any of three directions via separate electronic switches. Using appropriate firmware for keyboard 10, users may program into keyboard 10 appropriate alternate designations to one or both spacebar halves 22 and 24. With such modification the user may use the left hand thumb, for example, to actuate a space signal and the right hand thumb on space bar half 24 to activate a signal corresponding to a letter, number, cursor movement, or other designation programmed in by the user. Similarly, it is also possible to program alternate designations for each directional movement of space bar halves 22 or 24. In this way, the user may wish to designate, for example, downward movement on either or both halves, 22 and 24 in the direction of arrows 138 and 139 as initiating a space signal. The lateral movement in the direction of arrows 130 and 131 may be programmed with some other designation, and movement in the direction of arrows 134 and 135 may be assigned with yet another designation. In this way the thumbs of a user may be put to more efficient use in facilitating typing or initiation of various "macro" commands programmed into keyboard 10 or the electronic device.

In order to maintain halves 22 and 24 in a normal position with the upper face 170 in general coplanar orientation with respect to the keys on demi-boards 12 and 14, springs (not shown) are provided to encircle each button on switches 150, 152 and 154. The springs extend to contact the facing side of flange 158 to maintain flange 158 in a generally normal position between switches 150, 152 and 154. Springs (not shown) are depressed upon movement of hinge 142 in either of the directions 131, 135 and 139 in order to activate switches 152, 150 and 154, respectively.

Hand Rests

The hand rests of the present invention will now be discussed with particular reference to FIGS. 1A and 10. As seen in FIG. 1A hand rest 201 is connected to the proximate side of base member 16 by a pair of screws 202 extending vertically from beneath base member 16. Hand rest 201 may be removed from keyboard 10 by removing screws 202. Hand rest 201 includes support 204 extending longitudinally for a portion of the length of base member 16. Support 204 includes a pair of aligned longitudinal slots 206 and a corresponding pair of rest members 208 for resting the hands of a user. Members 208 are slidable along slots 206 for lateral adjustment.

Figure 10:
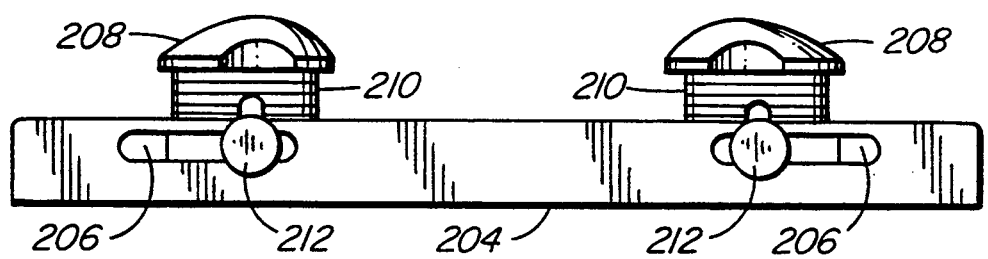
FIG. 10 is a front view of the hand rests in accordance with this invention.

As seen in FIG. 10 rest members 208 are contoured with their highest point being generally toward the centre of support 204. Referring to FIG. 10, each rest member 208 is connected to support 204 by flange 210 having a plurality of longitudinal grooves 212 on a face thereof. Securing screw 210 extends from grooves 210 to secure rest members 208 at a position selected by the user.

Figure 12:
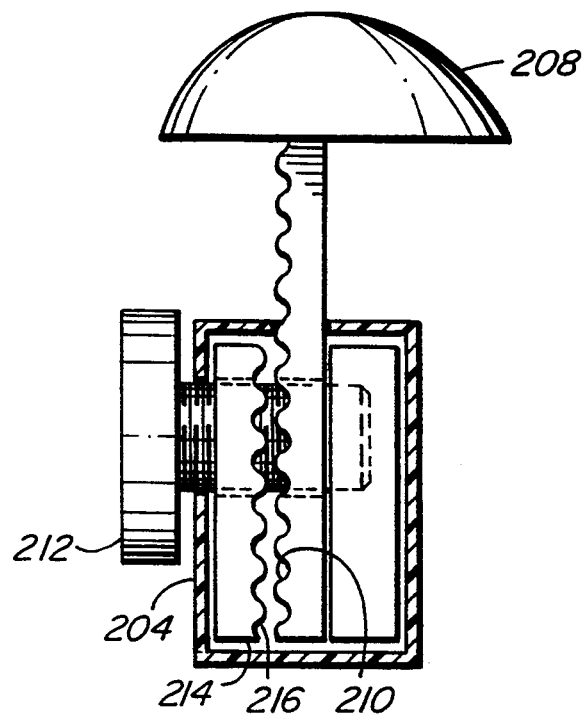
FIG. 12 is a close-up plan view of a portion of the keyboard showing the hand rests in accordance with this invention.

As seen in FIG. 12, securing screw 212 extends through securing member 214 which is moveable horizontally within support 204 and which contains grooved portions 216 for mating with grooves 210. When securing screw 212 is loosened, handrest 208 can be raised or lowered manually to the desired height. The tightening of securing screw 212 will cause grooves 216 to mate with grooves 210 thereby preventing upward or downward movement of rest member 208. When screw 212 is tightened to a predetermined point, but not completely tightened, sufficient free-play will exist to permit lateral movement of rest members 208 while preventing upward or downward movement of rest members 208. In this way, the user can first adjust the height of rest members 208 and then adjust the width of the rest members once the height adjustment has been made. The width adjustment can then be made without causing alteration of the height adjustment.

The optimal size of hand rest 208 support surface is approximately 52 mm proximal-distally and 59 mm. in the lateral direction. As can be appreciated, the positioning of slot 206, and the corresponding position of hand rest 208 with respect to keyboard 10, may be set at a variety of pre-determined positions. Preferably, the distal edges of hand rests 208 are positioned approximately 75 millimetres from the horizontal axis at the centre of the key row containing the F and J keys. The distance between each hand rest is about 46 millimetres, when hand rests 208 are in closest proximity with each other, and about 90 millimetres when hand rests 208 are separated the maximum distance permitted by slots 206. As well, the preferable distance between the top of the contour of hand rest 208 and the base of hand rest 208 is 17.5 millimetres. The top of hand rest 208 is between 5 and 10 mm. higher than the height of the key contact points of the F and J keys when keyboard 10 is in its flat, retracted position. A variety of upward and downward positioning of hand rest 208 is required to accommodate the differing hand positions dictated by the range of demi-board adjustments permitted by keyboard 10. The following are suggested positioning from the zero position in which base of hand rest 208 is essentially coplanar with the upper proximal face of base member 16 with successive raised positions of the base of the hand rest from the upper surface of base member 16:

| Level | Distance from Base |
|-------|--------------------|
| 0     | 0                  |
| 1     | 5 mm               |
| 2     | 9 mm               |
| 3     | 13 mm              |
| 4     | 17 mm              |

The choice for selection of height and width for hand rests 208 will in part depend upon the individual anatomy of the user and upon the spatial relationships of the height of the user, whether standing or seated, to the height of the supporting surface on which keyboard 10 is placed when in use.

We claim:

1. An adjustable keyboard for data input, comprising:
    (a) a base member for contact with a support surface, said base member defining a longitudinal base plane extending through said base member, said base member having a distal side intended for orientation away from a user and a proximate side intended for orientation adjacent a user and first and second ends joining said distal and proximate sides;
    (b) a first demi-board means having a distal side for orientation away from a user and a proximate side for orientation adjacent a user, defining a first demi-board plane extending longitudinally through said first demi-board means, pivotably connected to said base member and constrained for pivotal movement of said first demi-board means for reproducing a pre-determined arc and reproducible positions between a retracted position in which said first demi-board plane is substantially co-planar and parallel with said base plane and an extended position in which said first demi-board means extends at an acute angle with respect to said base member;
    (c) a plurality of user activated keys extending from a face of said first demi-board means, said keys facing away from said base member;
    (d) a second demi-board means having a distal side for orientation away from a user and a proximate side for orientation adjacent a user, defining a second demi-board plane extending longitudinally through said second demi-board means, pivotably connected to said base member and constrained for pivotal movement of said second demi-board means for reproducing a predetermined arc and reproducible positions between a retracted position in which said second demi-board plane is substantially co-planar and parallel with said base plane and an extended position in which said second demi-board means extends at an acute angle with respect to said base member;
    (e) a plurality of user activated keys extending from a face of said second demi-board means, said keys facing away from said base member;
    (f) when in said extended position said base plane, first demi-board plane, second demi-board plane and proximate sides of said first and second demi-board means forming a tetrahedral shape wherein:
        (i) the distal side of one of said demi-board means is located closer to the other demi-board means than the proximate side of said one of said demi-board means;
        (ii) said first and second planes each intersect with said base plane to form an acute angle;
        (iii) said first and second intersect with each other at an apex intersecting line in space, said apex intersecting line being in non-parallel alignment with the base plane; and
        (iv) said first, second and base planes intersect with each other at an intersecting point in space beyond the distal side of said base member.

2. A keyboard as described in claim 1, wherein:
    (a) the horizontal rotation angle, being the angle between the outer end of the base member and the outer end of either demi-board means is between about 0° and 30°; and
    (b) the elevation angle, being the angle between the plane of the base member and the plane of either demi-board means is between 0° and 60°.

3. A keyboard as described in claim 2, wherein the rotation angle is about 1° and the elevation angle is about 10°.

4. A keyboard as described in claim 2, wherein the rotation angle is about 2° and the elevation angle is about 20°.

5. A keyboard as described in claim 2, wherein the rotation angle is about 7° and the elevation angle is about 30°.

6. A keyboard as described in claim 2, wherein the rotation angle is about 16° and the elevation angle is about 40°.

7. A keyboard as described in claim 2, wherein the rotation angle is about 26° and the elevation angle is about 50°.

8. A keyboard as described in claim 1, wherein said keys are oriented in rows extending longitudinally along each demi-board means, said keys in each row being offset with respect to keys in adjacent rows, a distance of about one-half a key width and wherein said first and second demi-board means further comprise inner ends adjacent one another when said demi-board means are in said retracted position, said inner ends being offset to correspond with the said offset of key rows.

9. A keyboard as described in claim 1, wherein said first demi-board means rotates laterally about a first rotation axis located adjacent the proximate side of said base member said first rotation axis being perpendicular to said base plane and wherein said second demi-board means rotates laterally about a second rotation axis located adjacent the proximate side of said base member said second rotation axis being perpendicular to said base plane.

10. A keyboard as described in claim 9, wherein said first demi-board means rotates vertically about a first rise axis adjacent said first rotation axis said first rise axis being parallel with said base plane and wherein said second demi-board means rotates vertically about a second rise axis adjacent said second rotation axis said second rise axis being parallel with said base plane.

11. A keyboard as described in claim 1, wherein said first demi-board means rotates about a first angular axis being at an acute angle with respect to said base plane and wherein said second demi-board means rotates about a second angular axis being at an acute angle with respect to said base plane.

12. A keyboard as described in claim 1, wherein said first demi-board means further comprises first lateral constraining means for constraining movement of the outer distal corner of said first demi-board means laterally in a plane parallel with said base plane, and wherein said second demi-board means further comprises second lateral constraining means for constraining movement of the outer distal corner of said second demi-board means laterally in a plane parallel with said base plane.

13. A keyboard as described in claim 12 wherein said first lateral constraining means comprises a first helix screw rotatably connected to said keyboard and extending longitudinally along said keyboard and screw contacting means for contacting said first helix screw and for lateral movement along said first helix screw on rotation of said helix screw and wherein said second lateral constraining means comprises a second helix screw rotatably connected to said keyboard and extending longitudinally along said keyboard and screw contacting means for contacting said second helix screw and for lateral movement along said second helix screw on rotation of said second helix screw.

14. A keyboard as described in claim 13 wherein said first and second helix screws are joined together and wherein the screw blades of the first helix screw are in the opposite direction to the screw blades of the second helix screw.

15. A keyboard as described in claim 1, further comprising indicator means for indicating the extent of horizontal position of the first demi-board means, said indicator means comprising locating means for locating the lateral position of said outer distal corner of said first demi-board means with respect to said base member.

16. A keyboard as described in claim 15, wherein said locating means comprises a visual indicator revealing the position of said outer distal corner of said first demi-board means with respect to said base member.

17. A keyboard as described in claim 1, further comprising a space bar means for indicating a space, located on the proximate side of each of the first and second demi-board means.

18. A keyboard as described in claim 1, further comprising hand resting means for resting the hand of a user, said hand resting means located at the proximate side of said base member and being connected thereto.

19. A keyboard as described in claim 1, wherein said keys have colour coded control key, shift key and alt key.

20. A keyboard as described in claim 1, further comprising supporting means for supporting the inner sides of the said first and second demi-board means and for joining said first and second demi-board means, said supporting means being rotatably attached to said base member for lateral movement about a support rotation axis extending longitudinally parallel with the longitudinal axis of said base member, said supporting means extendable from a retracted position in which said supporting means is positioned horizontally and an extended position in which said supporting means extends at an angle with respect to said base member.

21. A keyboard as described in claim 20, wherein said supporting means comprises first contact means for contacting and supporting said first demi-board means and second contact means for contacting and supporting said second demi-board means, said first and second contact means being in parallel alignment with said base plane.

22. A keyboard as described in claim 20, wherein said supporting means is rotatably connected to each demi-board means and wherein the distance between the F and J keys of a QWERTY keyboard layout is between about 57 millimeters and 95 millimeters throughout the range of positions of said first and second demi-board means from the retracted to the fully extended positions.

23. A keyboard as described in claim 20, wherein said supporting means is biased in the extended position and wherein said base member further comprises latch means for latching said supporting means in the retracted position, said biasing means extending said supporting means from the retracted position on release of said latching means.

24. A keyboard as described in claim 20, wherein said demi-board means are connected to said supporting means by ball and socket joint.

25. A keyboard as described in claim 1, wherein said keys comprise a first control key, a first shift key and a first alt key located on said demi-board means and a second control key, second shift key and second alt key located on said base member.

26. A keyboard for dam input into an electronic device, comprising:
(a) a base member for contact with a support surface, said base member defining a longitudinal base plane extending through said base member, said member having a distal side intended for orientation away from a user and a proximate side intended for orientation adjacent a user when in use, and first and second ends joining said distal and proximate sides;
(b) a first demi-board connected adjacent said first end of said base member at one end of said first demi-board and extending angularly from said base member, said first demi-board defining a first demi-board plane extending longitudinally through said first demi-board and said first demi-board comprising a plurality of user activated keys extending from a face of said first demi-board said keys facing away from said base member, a distal side for orientation away from a user and a proximate side for orientation adjacent a user;

(c) a second demi-board connected adjacent said second end of said base member at one end of said second demi-board and extending angularly from said base member, said second demi-board defining a second demi-board plane extending longitudinally through said second demi-board, said second demi-board comprising a plurality of user activated keys extending from a face of said second demi-board said keys facing away from said base member, a distal side for orientation away from a user and a proximate side for orientation adjacent a user;

(d) pivot means and constraining means communicating with said base member and said first and second demi-boards for pivotal movement of said first and second demi-boards with respect to said base member for reproducing a pre-determined arc and reproducible positions for each of said first and second demi-boards with respect and (e) said first and second demi-boards oriented such that when in an extended position in which said first and second demi-boards each extend at an acute angle with respect to said base member:

(i) the distal side of one of said demi-board is located closer to the other of said demi-boards than the proximate side of said one of said demi-boards;

(ii) said first and second demi-board planes each intersect with said base plane to form an acute angle;

(iii) said first and second demi-board planes intersect with each other at an apex intersecting line in space, said apex intersecting line being in non-parallel alignment with the base plane; and (iv) said first demi-board, second demi-board and base planes intersect with each other at an apex intersecting point in space beyond the distal side of said base member.

27. A keyboard as described in claim 1, further comprising demi-board connecting means for connecting said first and second demi-board means together for symmetrical movement of said demi-board means when moved between said retracted and extended positions of said demi-boards.

28. A keyboard as described in claim 27, wherein said connecting means is rotatably connected to said base member for rotational movement about an axis parallel to the longitudinal axis of said base member.

29. A keyboard as described in claim 28, wherein said first demi-board means further comprises first lateral constraining means for constraining movement of the outer distal corner of said first demi-board means laterally in a plane parallel with said base plane and wherein said second demi-board further comprises second lateral constraining means for constraining movement of the outer distal corner of said second demi-board means laterally in a plane parallel with said base plane.

* * * * *